(12) United States Patent
Moore et al.

(10) Patent No.: US 8,548,950 B2
(45) Date of Patent: Oct. 1, 2013

(54) METHOD AND SYSTEM FOR DATA ARCHIVING

(75) Inventors: Wayne Moore, San Francisco, CA (US); David R. Parks, San Francisco, CA (US); Leonore A. Herzenberg, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 445 days.

(21) Appl. No.: 12/470,215

(22) Filed: May 21, 2009

(65) Prior Publication Data

US 2010/0161561 A1 Jun. 24, 2010

Related U.S. Application Data

(60) Provisional application No. 61/055,322, filed on May 22, 2008.

(51) Int. Cl.
*G06F 17/30* (2006.01)

(52) U.S. Cl.
USPC .......................................... 707/661

(58) Field of Classification Search
None
See application file for complete search history.

(56) References Cited

U.S. PATENT DOCUMENTS

| | | | | |
|---|---|---|---|---|
| 5,751,997 A * | 5/1998 | Kullick et al. | ................. | 711/162 |
| 6,014,089 A * | 1/2000 | Tracy et al. | .............. | 340/870.02 |
| 7,080,260 B2 * | 7/2006 | Johnson | .......................... | 713/193 |
| 7,203,711 B2 * | 4/2007 | Borden et al. | .......................... | 1/1 |
| 7,251,642 B1 * | 7/2007 | Szeto | ..................... | 1/1 |
| 7,277,903 B2 * | 10/2007 | Petrocelli | .............. | 1/1 |
| 7,363,290 B1 * | 4/2008 | Daniel et al. | .................. | 707/673 |
| 7,761,429 B2 * | 7/2010 | Polimeni | ...................... | 707/668 |
| 2005/0097173 A1 * | 5/2005 | Johns et al. | .................... | 709/206 |
| 2006/0015555 A1 * | 1/2006 | Douglass et al. | ............. | 709/203 |
| 2007/0038687 A1 * | 2/2007 | Carroll et al. | .................. | 707/204 |
| 2008/0091655 A1 * | 4/2008 | Gokhale et al. | ................... | 707/3 |
| 2008/0263007 A1 * | 10/2008 | Schmidt | ........................... | 707/3 |

OTHER PUBLICATIONS

Huang et al. "Data Grid for Large-Scal Medical Image Archive and Analysis," MM'05, Nov. 6-11, 2005, ACM 2005.*
Mattmann et al. "A Software Architecture-Based Framework for Highly Distributed and Data Intensive Scientific Applications," ISCE'06, May 20-28, 2006, ACM 2006.*
Conner, Nancy, "Google Apps: The Missing Manual, 1st Edition," Chapters Introduction, 2.2, 2.4, 2.7 and 2.8, Jun. 3, 2008.*

* cited by examiner

*Primary Examiner* — Fred I Ehichioya
*Assistant Examiner* — Richard Bowen
(74) *Attorney, Agent, or Firm* — Beverly W. Lubit; Greenberg Traurig, LLP

(57) ABSTRACT

Disclosed is a method and system for archiving data. A server computer (or any computing device) receives data transmitted over a network from a client computer, wherein at least some of the data was previously collected by a scientific instrument during an experiment. After receiving the data, the server computer updates (e.g., creates) an index for the received data, archives the received data, and automatically transmits a notification to the client computer that the received data has been archived.

18 Claims, 6 Drawing Sheets

METHOD AND SYSTEM FOR DATA ARCHIVING

CROSS-REFERENCE TO RELATED APPLICATION

This application claims the benefit of U.S. Provisional Patent Application No. 61/055,322, filed May 22, 2008, entitled "Low Cost and Energy Efficient Project Management and Data Archiving System and Methods", which is incorporated by reference herein.

FIELD

The present disclosure relates to data archiving and, more specifically, to the archiving of data that at least in part has been collected by a scientific instrument during a scientific experiment.

BACKGROUND

The use of data archiving systems to provide for online storage for computer processing systems that is separate from the primary or main memory of the computer processing system is well known. Examples of current secondary storage systems include magnetic disk drives, optical disk drives, magnetic tape drives, and solid state disk drives. Typically, secondary storage systems have much larger memory capacities than the primary memory of a computer processing system.

As the popularity of distributed computer networks has increased, the demand to store ever increasing volumes of data as remote files also has increased. In response to this demand, a number of remote secondary storage systems have been developed primarily for the purpose of storing remote files. These secondary storage systems, known as data servers, file servers or information servers, are not connected to an individual computer like a traditional secondary storage device; rather they are connected to the distributed network itself.

Most existing data servers either rely on individual users to manually perform back up of remote files or, when the amount of available secondary storage space falls below some minimum amount, use some type of least-recently used archival algorithm whereby all remote files that have not been accessed for a given period of time are archived to removable secondary storage devices. Unfortunately, neither of these techniques provides for an intelligent or reliable archiving of remote files. Those data servers that have individual users manually back up files usually end up requiring some type of network administrator intervention whenever the amount of available secondary storage space falls below the required minimum amount to effectively operate the network data server because users cannot be relied on to back up and then remove inactive remote files consistently. On the other hand, those data servers that automatically archive remote files that have not been accessed for a given period of time and blindly apply the archiving algorithm to all remote files, end up being unable to accommodate, for example, online storage of large or very large remote files that must be quickly accessed at all times, but can have certain periods of inactivity.

SUMMARY

Disclosed herein is an archiving system that automatically manages the long-term storage and retrieval of large volumes of data as part of a network data server. In an embodiment, the system coordinates and organizes data in a way where files associated with certain project or experiment are stored together, and automatically creates at least two copies of the data, one of which is written to a random-access storage media.

The present disclosure relates to a method and system for archiving data. A server computer (or any computing device that is capable of performing the functions described herein) receives data transmitted over a network from a client computer (or any computing device that is capable of performing the functions described herein). In one embodiment, at least some of the data was previously collected by a scientific instrument during an experiment. After receiving the data, the server computer creates or updates an index for the received data, archives the received data, and automatically transmits a notification to the client computer that the received data has been archived (e.g., transmits an email, posts a message/index to a program accessible by the client computer, etc.). In one embodiment, the archiving includes copying the data and/or the index from the server computer to two or more removable storage media, such as, for example, offline storage media such as DATs, holographic optical discs, DVDs, CDs, and/or Blu-ray discs, or other generally high capacity magnetic electronic or optical storage media suitable for archival storage and/or offline backup or security applications. As used herein, the term "offline storage" is intended to encompass all of the foregoing media examples and their art-recognized equivalents.

In one embodiment, the server computer determines that the client computer is on a list of specified client computers before accepting the data from the client computer. The data can include one or more files, and the one or more files can be organized into one or more file sets. In one embodiment, the files are secured, such as with a digital signature.

In one embodiment, the data is removed from the server computer when the server computer requires additional storage space. In one embodiment, the archiving step includes storing the received data and/or index in two or more offline storage media. The data removed from the server computer can be retrieved from the two or more offline storage media (e.g., upon user request). In one embodiment, the server computer can automatically create, verify, index, and/or label the two or more offline storage media.

In one embodiment, the offline storage media transmits confirmation that the copying step has been successfully completed to the server computer. In a further embodiment, the server computer transmits confirmation (e.g., an email message) to the client computer that the copying step has been successfully completed.

These and other aspects and embodiments will be apparent to those of ordinary skill in the art by reference to the following detailed description and the accompanying drawings.

BRIEF DESCRIPTION OF THE DRAWINGS

In the drawing figures, which are not to scale, and where like reference numerals indicate like elements throughout the several views.

DESCRIPTION OF EMBODIMENTS

Figure 1:
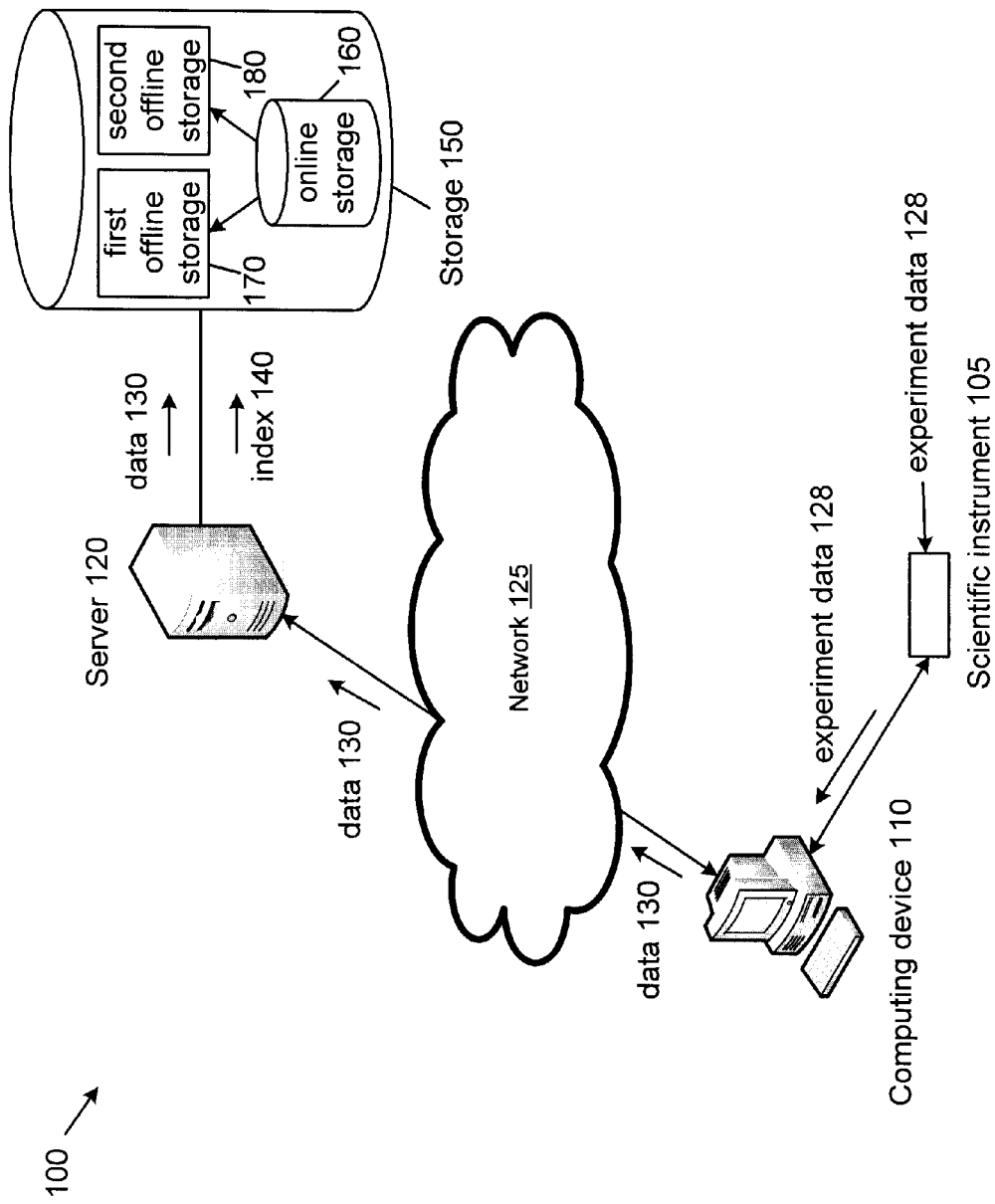
FIG. 1 is a block diagram of a server computer in communication with a computing device and a storage for use in archiving data associated with an experiment conducted using a scientific instrument in accordance with an embodiment of the present disclosure.

Embodiments are now discussed in more detail referring to the drawings that accompany the present application. In the accompanying drawings, like and/or corresponding elements are referred to by like reference numbers.

Various embodiments are disclosed herein; however, it is to be understood that the disclosed embodiments are merely illustrative of the disclosure that can be embodied in various forms. In addition, each of the examples given in connection with the various embodiments is intended to be illustrative, and not restrictive. Further, the figures are not necessarily to scale, some features can be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

FIG. 1 shows a block diagram of an embodiment of a system 100 which includes a scientific instrument 105 in communication with a computing device 110 (e.g., a client computer, desktop or laptop computer, PDA, smartphone, network appliance, or the like), which is in communication with a server 120 (or other computing device) over a network 125 such as the Internet. As used herein, a "scientific instrument" is any instrument used in the preparation of a scientific experiment, to conduct a scientific experiment, or to analyze information generated from, during, or associated with a scientific experiment. The scientific instrument 105 can be, for example, a probe or monitoring device, a lab instrument, a DNA sequencer, a Fluorescence-Activated Cell Sorter (FACS) or similar tool, device or system. The scientific instrument 105 collects experiment data 128 from one or more sources (e.g., one or more people and/or animals) and delivers the experiment data 128 to the computing device 110. As used herein, "experiment data" is any data generated or collected by a scientific instrument 105. In one embodiment, the scientific instrument 105 transmits or communicates the experiment data 128 to the computing device 110 continuously. In another embodiment, the scientific instrument 105 transmits or communicates the experiment data 128 to the computing device 110 periodically, or at particular times, such as after collecting a predetermined amount of experiment data 128, or upon request. Such transmission or communication can occur over a direct or indirect wired, or wireless, networked or direct link connection.

The computing device 110 receives the experiment data 128 from the scientific instrument 105. As described above, the experiment data 128 associated with an experiment can include information generated during an experiment as well as information generated before and/or after the experiment is conducted. For example, experiment protocols are designed before the experiment for use during the experiment. A protocol can include determining which reagents to use in the experiment, which instruments to use in the experiment, particular events that need to occur during the experiment, and/or the time period(s) at which the particular events need to occur during the experiment. In one embodiment, after experiment data 128 is collected and transmitted to the computing device 110, the computing device 110 generates data 130, which can include how to organize the experiment data 128. Data 130 can include, but is not limited to, letters, manuscripts, grants, and/or statistics. The computing device 110 transmits all (or a portion) of the data 130 associated with an experiment over the network 125 to the server 120. The data 130 can include, for example, one or more Word files, Excel files, PDFs, and/or data set documents.

For purposes of this disclosure, (see, e.g., FIG. 6) a computer or computing device such as the computing device 110 and/or server 120 includes a processor and memory for storing and executing program code, data and software which can be stored or read from computer readable storage media. Computers can be provided with operating systems that allow the execution of software applications in order to manipulate data. Personal computers (e.g., desktop computers or laptop computers), personal digital assistants (PDAs), wireless devices, cellular telephones, internet appliances, media players, home theater systems, servers, and media centers are several non-limiting examples of computing devices. The computing device 110 (and/or server 120) can, in one embodiment, also include a display, such as a screen or monitor. Further, although shown with one scientific instrument 105, one computing device 110, one server 120, and one storage 150, any number of any of these components can be present in the system 100. For example, multiple computing devices can collect experiment data from one or more scientific instruments and transmit data to one or more servers.

In one embodiment, the computing device 110 enables a user to bring together and organize many different kinds of information, including, for example, word processing and spreadsheet documents to complex multi-media databases, catalogs, and presentations, to launch many different computer applications and track the output in the same environment, and to describe, index and search for material in current use and archived. The phrase "archived" as used herein means copied to the server 120 and copied to a random-access storage media (e.g., storage 150).

In one embodiment, the computing device 110 adds annotation information to the data 130 (e.g., organizes (or receives input from a user to organize) related files in the data 130 into one or more file sets) before transmitting the data 130 to the server 120. In one embodiment, the server 120 and computing device 110 perform a "handshake" operation. In one embodiment, the computing device 110 confirms ownership of the files in the one or more file sets before transmitting the data 130 to the server 120. Further, the one or more file sets (or files) can be made secure (e.g., by protecting each file set with a password or a digital signature). In one embodiment, the computing device 110 can receive input related to particular personnel of an organization who should be given access to the one or more file sets. The computing device 110 can apply one or more pre-processing algorithms (e.g., add information to a file or normalize data) and secure the data 130. In one embodiment, the computing device 110 performs post-processing algorithms (e.g., clusters data or analyzes data and extracts cell type (e.g., CD4T cells)). In one embodiment, the computing device 110 can then transmit the data 130 to the server 120.

The computing device 110 may be referred to as a "curator" because the device 110 can curate the experiment data (e.g., receiving labeling and protocol information, assuring that the data are appropriately labeled, associating with protocol information, combining relevant files in a "tamperproof" wrapper, shipping the data off to the server 120/cloud, etc.

In one embodiment, the server 120 receives the data 130 and creates or updates an index for the data 130. The term "index" as used herein means a listing of the data 130, as well as other information. This other information can include, but is not limited to, the project title, the name of the user who created the file(s) in the data 130, the date the files were created, the computing device 110 that transmitted the data 130, and the like. In one embodiment, the index contains annotations (e.g., labels) for one or more files of the data 130. For example, the server 120 can generate metadata for one or more of the files in the data 130 and associate one or more labels with the one or more files in the index.

In one embodiment, the server 120 indexes the data 130 in such a way that related documents contain the same index key. Thus, in one embodiment each file in the data 130 can be opened by a user (e.g., accessing the server 120 over the network 125 using the computing device 110) using a single index key. The index 140 can enable the internal tracking of the data locations, keeping the actual location of the data transparent to the user. In one embodiment, the server 120 maintains and/or stores the index. In one embodiment, the server 120 accepts the data 130 from the computing device 110 after determining that the computing device 110 is on a list of specified computing devices. The server 120 can have this list stored in memory or can retrieve this list from the network 130.

In one embodiment, the server 120 then copies the data 130 and index 140 to storage 150. In one embodiment, the server 120 copies the data 130 and the index 140 to a self-managing online storage 160, such as memory, cache, a networked hard drive, and/or a RAID array. In one embodiment, the online storage 160 transmits (e.g., copies) the data 130 (and/or the index 140) to two or more offline storage media, such as a first offline storage 170 and a second offline storage 180. In another embodiment, the server 120 transmits copies of the data 130 and the index 140 directly to the first and second offline storage 170, 180. In one embodiment, the computing device 110 retains a copy of the data 130 that was transmitted to the server 120 until the server 120 verifies, via some communication (e.g., via an email or message command sent from the server 120 to the client computer 110) that the data 130 has been archived (e.g., copied to at least the first and second offline storage media 170, 180). In one embodiment, the server 120 keeps track of what data has been written to the offline storage media 170, 180.

In one embodiment, the storage 150 manages itself. For example, the online storage 160 can automatically write the data 130 and index 140 to the offline storage media 170, 180. In one embodiment, the storage 150 (i.e., the online storage 160 and/or one or more of the offline storage 170, 180) can notify a user of the server 120 or a user of the computing device 110 who is accessing the server 120 that a change has been made to one or more files that are being stored. In one embodiment, files stored in storage 150 (the online storage 160 and/or the offline storages 170, 180) can be accessed or retrieved via one or more links (e.g., Universal Resource Identifiers, or URIs) that are accessed by or transmitted (e.g., via email) to the computing device 110.

In one embodiment, the online storage 160 can take up a relatively small amount of space, as the server 120 can store most of the data in offline storage 170, 180. Using the index, the server 120 can retrieve all or a portion of the data from the online storage 160 or the offline storage 170, 180. Further, in one embodiment the server 120 can alert a user of the computing device 110 if data associated with the user has been lost. If so, in one embodiment the server 120 can reconstitute the lost data from one or more of the online storage 160, offline storage 170, and/or offline storage 180.

In one embodiment, the server 120 deletes least-recently-used (LRU) secure file sets from the online storage 160 to recover space for new file sets. Thus, the server 120 determines that all other secure file sets in the online storage 160 were written or accessed more recently than the one that is selected for removal. The server 120 can use the index to subsequently retrieve the removed data from the two or more offline storage media 170, 180.

In one embodiment, archives from the first and/or second offline storage 170, 180 are automatically migrated to new media without impacting user links to data. In one embodiment, the storage 150 or server 120 automatically restores requested data from the offline storage 170 or 180 to the online storage 160 by inserting the specified media (e.g., CDs, DVDs, or Blu-Ray discs) into a disk reader. There can be one or multiple data restoration modes. For example, a first mode can include the server 120 uploading data sets that were specifically requested by a user. A second mode can include the server 120 uploading the entire file set when a particular file is requested from the file set. In another embodiment, the requested data is read directly from the offline storage 170 and/or 180. In one embodiment, the server 120 keeps track of where the data is currently located and where the data was previously located (via the index).

In one embodiment, a user of the computing device 110 can access the server 120 over the network 130 to retrieve or view one or more files stored in the storage 150. In one embodiment, the server 120 provides a password-controlled login interface that restricts users to viewing only their own archived material. In one embodiment, the server 120 transmits one or more emails to the computing device 110 confirming that a particular file set has been securely stored. Further, the user of the computing device 110 can use links in the email to download the secure file sets for data analysis and/or to launch a cooperating data analysis program (e.g., FlowJo) that retrieves data directly from the storage 150.

Thus, in one embodiment the server 120 enables a user to output requested data to a user-assigned location. The server 120 obtains the requested data from an online storage 160 or from an offline storage 170, 180. The server 120 and/or storage 150, 160, 170 and/or 180 can be located anywhere (e.g., the network cloud 125, an external cloud or group of one or more servers).

Although described as data 130 obtained (at least in part) from experiment data 128, the data 130 can be obtained from any source or can be generated by the computing device 110. The data 130 is any data that is to be archived.

In one embodiment, the amount of energy needed to retrieve data in system 100 is smaller than the amount of energy typically expended to retrieve data in conventional computer systems. In particular and as described above, data is stored in one or more offline storage (e.g., offline storage 170 and/or 180), such as CD-ROMs or DVDs. As a result, instead of having a large amount of data spinning on an online storage (which is often the case in conventional computer systems), in this embodiment only a small amount of data is kept spinning on the online storage 160 while most of the data is stored in offline storage. Thus, unlike the conventional computer systems described in the Background, which usually require significant cooling mechanisms (e.g., fans, air conditioning, etc.) for their online storage, the online storage in this embodiment is storing a small amount of data and, as a result, needs minimal cooling. When the server 120 needs to retrieve data in this embodiment, the server 120 can access its index to locate the data from either online or offline storage.

Figure 2:
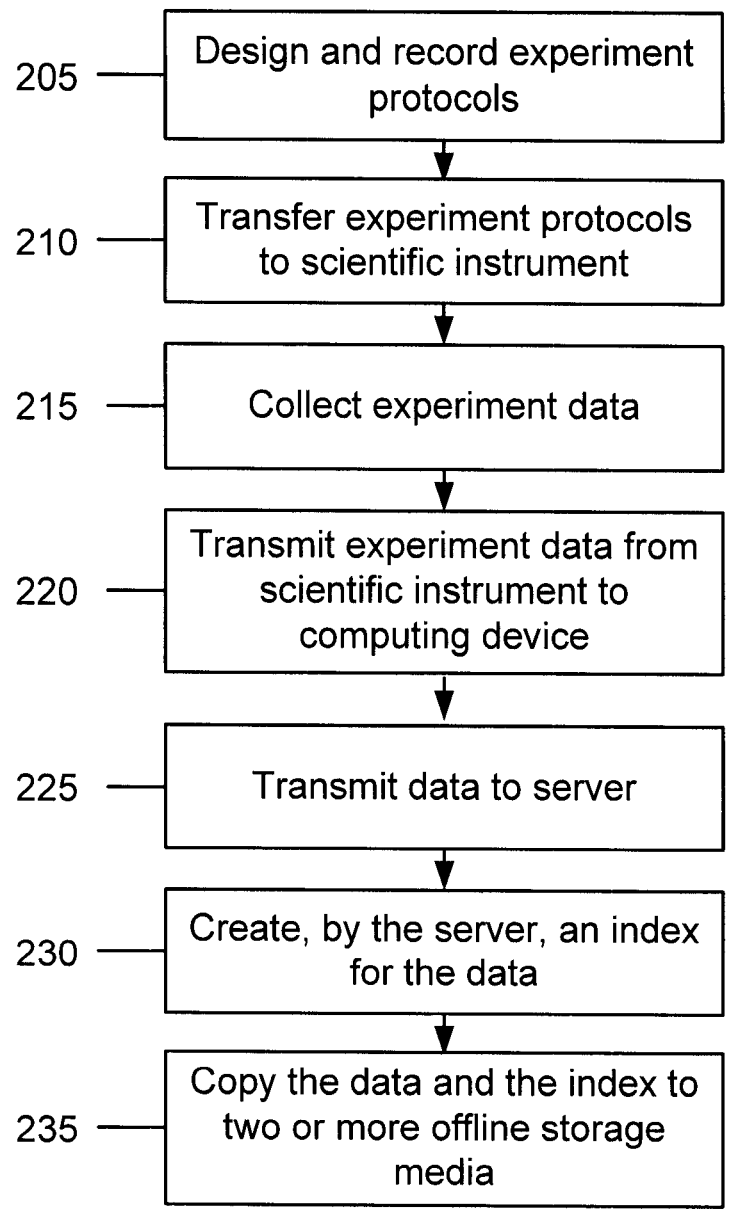
FIG. 2 is a flowchart illustrating the steps performed to archive data associated with an experiment conducted using the scientific instrument of FIG. 1 in accordance with an embodiment of the present disclosure.

FIG. 2 shows a flowchart illustrating an embodiment of the steps performed to archive data in accordance with this disclosure. Before data is collected, a user designs and records one or more experiment protocols (step 205). For example, the user can use the computing device 110 to select reagents, define samples, create controls, enter keywords, print pipetting maps, and/or create instrument control files for the scientific instrument 105. In one embodiment, one or more individuals can enter particular information related to the experiment, such as information about lasers, filters, instruments, fluorochrome spectra, etc. into the computing device 110. Further, one or more (of the same or different) individuals can enter the subject, sample, and other information necessary for individual experiments into the computing device 110. In one embodiment, the computing device 110 facilitates the composition of stain sets, facilitates the addition of necessary controls, and facilitates the making of other experiment design choices to complete the protocol.

In one embodiment, the computing device 110 automatically transfers the experiment protocols and instrument control files to the scientific instrument 105 in step 210. In one embodiment, the computing device 110 controls the scientific instrument 105. The scientific instrument 105 then collects experiment data 128 (step 215) and transmits the collected experiment data 128 (e.g., after all of the experiment data 128 is collected, after a predetermined amount of time, during the experiment data collection, etc.) to the computing device 110 (step 220). In one embodiment, the user uses the computing device 110 to organize the experiment data 128 into one or more files or file sets. In one embodiment, the computing device 110 receives a command (e.g., from the user) to archive data. The computing device 110 transmits data 130 to the server 120 in step 225. As described above, the server 120 creates an index for the data 130 in step 230. In one embodiment, the server 120 creates the index for the data 130 that the server 120 is maintaining in its online storage 160 as well as all of the data 130 that the server has written to offline storage 170, 180. In one embodiment, the server 120 further organizes the data 130/files/file sets (e.g., based on user specified rules or predetermined rules). As described above, the server 120 then automatically copies the data 130 and the index 140 to two or more offline storage media such as the first offline storage 170 and the second offline storage 180. In one embodiment, the server 120 automatically generates and transmits links (e.g., URIs) associated with the data/file sets to the computing device 110 so that the user can, for example, analyze the data by launching an analysis program. The link (s) can also assure permanent, readily located access to the data for the experiment.

The server 120 can also post the link in one or more locations (e.g., programs) for access by the user. The user of the computing device 110 can then access the data associated with the link by clicking on the link. Further, in one embodiment, if the location of the data changes (e.g., the server 120 migrates the data to a new media), the server 120 can find the data at its new location when the user clicks on the link (even if the link was sent to the user in an email before the migration took place). In one embodiment, the server 120 backs up the data stored in the online storage 160 and/or the offline storage 170, 180.

In one embodiment, the present disclosure provides a method and apparatus for low-cost and energy-efficient project management and data archiving whereby protocol data is sent from at least one client computer 110 to a protocol module. The protocol module then generates project data based on the protocol data. The project data is then sent to server 120. An index of the project data is created on the server 120. At least two copies of the index and the project data are created, where the index and project data are automatically copied to at least one random-access storage media. The index then is accessible from at least one client computer (e.g., computing device 110).

The term "module" as used herein means a linkable program unit that usually performs a particular function. A module may be implemented as a hardware circuit comprising custom VLSI circuits or gate arrays, off-the-shelf semiconductors, such as logic chips or transistors, or other discrete components. A module also may be implemented in programmable hardware devices, such as field programmable gate arrays, programmable array logic, programmable logic devices or the like. A module also may be implemented in software for execution by various types of processors. An identified module of executable code may, for instance, comprise one or more physical or logical blocks of computer instructions, which in some embodiments may be organized, for example, as an object, a procedure, or a function. The executables of an identified module need not be located together physically, but may comprise disparate instructions stored in different locations which, when joined logically together, comprise the module and achieve the stated purpose for the module.

The phrase "protocol data" as used herein means a set of instructions originally input by a user into the computing device 110. The phrase "protocol module" as used herein means a module that uses the protocol data to generate project data. The phrase "project data" as used herein means a set of files output from the protocol module. The phrase "random-access storage media" as used herein refer to a type of storage media where a user can jump directly to any data point to access stored data.

The methods described herein provide a significant savings in time, expense, and energy and have broad applicability, including project management for scientific experiments and other commercial and non-commercial uses.

Figure 3:
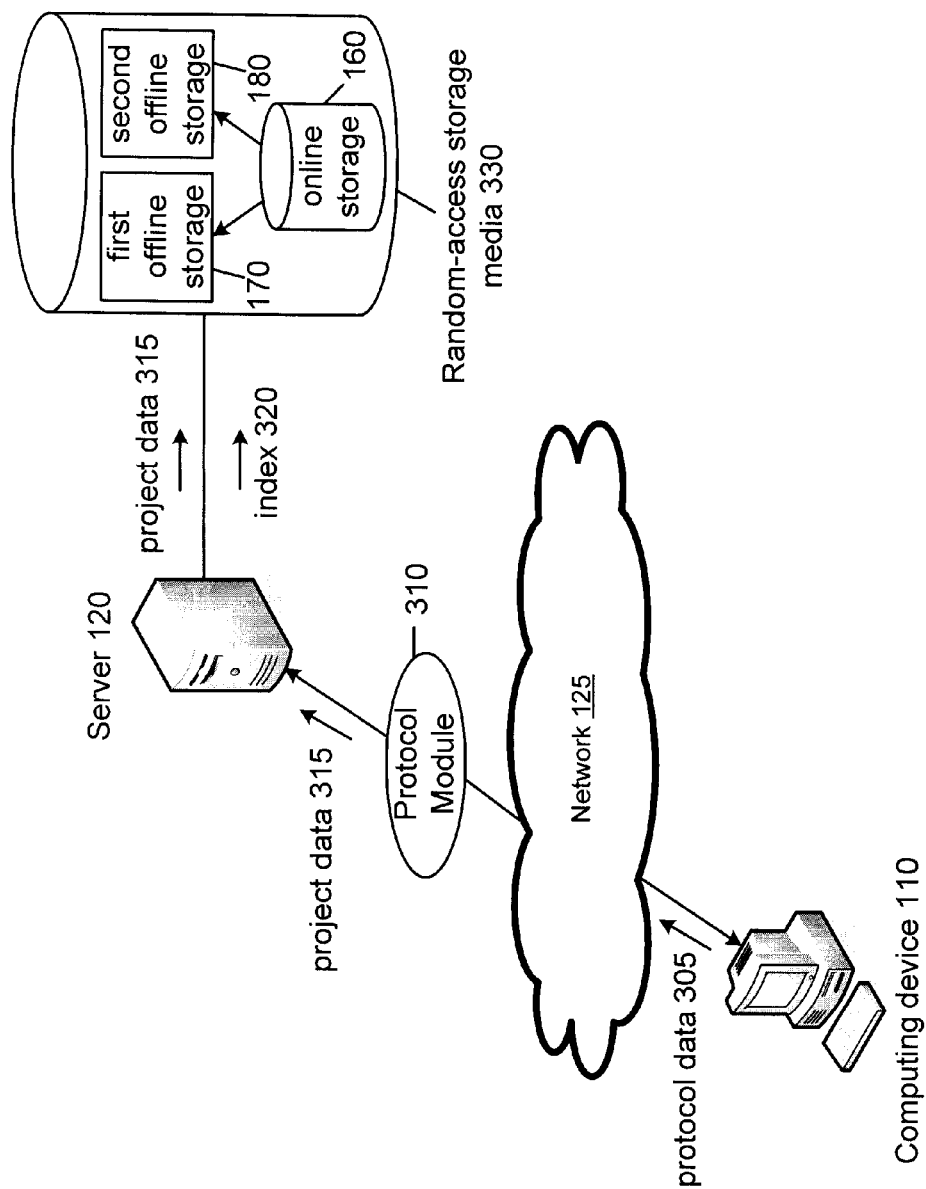
FIG. 3 is another block diagram of a server computer in communication with a computing device and a storage for use in archiving data in accordance with an embodiment of the present disclosure.

FIG. 3 depicts an embodiment of a method for project management and data archiving. In one embodiment, protocol data 305 is sent from at least one computing device 110 to a protocol module 310. The protocol module 310 then generates project data 315. The project data 315 is then transmitted to the server 120. Index 320 of the project data 315 is created on the server 120. In one embodiment, two copies of the index 320 and project data 315 are created. At least one of these copies is sent to a random-access storage media 330, and at least one copy of the index 320 is accessible from the computing device 110.

According to another embodiment, the protocol data 305 is obtained from the computing device 110. According to another embodiment, the protocol data 305 is removed from the computing device 110 as soon as the project data 315 is successfully transferred to the server 120.

Figure 4:
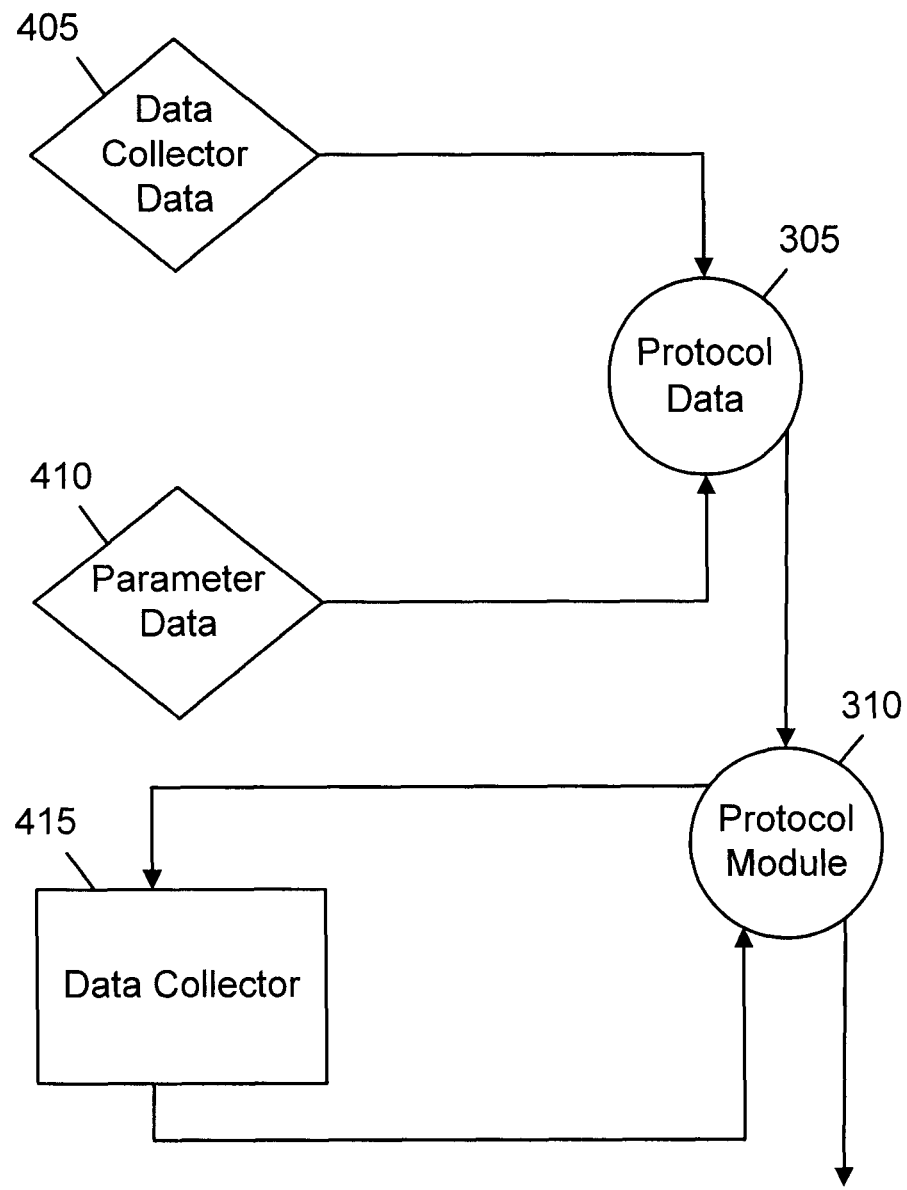
FIG. 4 is a block diagram depicting certain elements of protocol data, a protocol module, and project data used for project management and data archiving in accordance with an embodiment of the present disclosure.

FIG. 4 depicts another embodiment of a method for project management and data archiving whereby the protocol data 120 comprises data collector data 405 and parameter data 410. The phrase "data collector data" as used herein means data relating to the settings of a data collector. The phrase "data collector" as used herein means an instrument or device that gathers information based on the data collector data. The phrase "parameter data" as used herein means parameters or metrics that work in coordination with the data collector data to make up the protocol data.

According to another embodiment, the protocol module 310 generates project data 315 from at least one data collector 415 based on the protocol data 305. According to another embodiment, a user receives a confirmation that the project data 315 has been successfully archived through the computing device 110. According to another embodiment, the confirmation comprises a summary of the project data and internet-accessible links to the experiment data.

According to another embodiment, the project data 315 is tamper proof. The phrase "tamper proof" as used herein means that a message integrity code, or cryptographic checksum, is used to verify that the files and their contents have not been changed since their creation. This feature maintains the integrity of the project or experiment. In one embodiment, the server 120 only accepts project data 315 from authorized users. In another embodiment, the project data 315 is password-protected. The term "password-protected" as used herein means that a user needs to enter a password in order to gain access to the project data 315. This password may be, for example, user-specific, project-specific, data-specific, or the like.

According to another embodiment, the project data 315 is accessible from the computing device 110 through software, wherein the software is written in an object oriented language. In another embodiment, the software is an internet browser. Examples of internet browsers include, but are not limited to, Internet Explorer®, Mozilla Firefox®, Netscape®, Safari®, Opera®, and the like. In one embodiment, the random-access storage media 150 is automatically created, verified, indexed and labeled.

In one embodiment, the random-access storage media 150 includes, but is not limited to, a CD, a DVD, and a Blu-Ray disc. According to another embodiment, a list of contents is printed on the surface of the random-access storage media 150. In one embodiment, the server 120 comprises a single desktop or a single computer rack. In another embodiment, the server 120 only accepts project data 315 in authorized formats. The phrase "authorized formats" as used herein means files and data that are associated with a certain type of project, wherein only those file types are considered to be in authorized formats.

Figure 5:
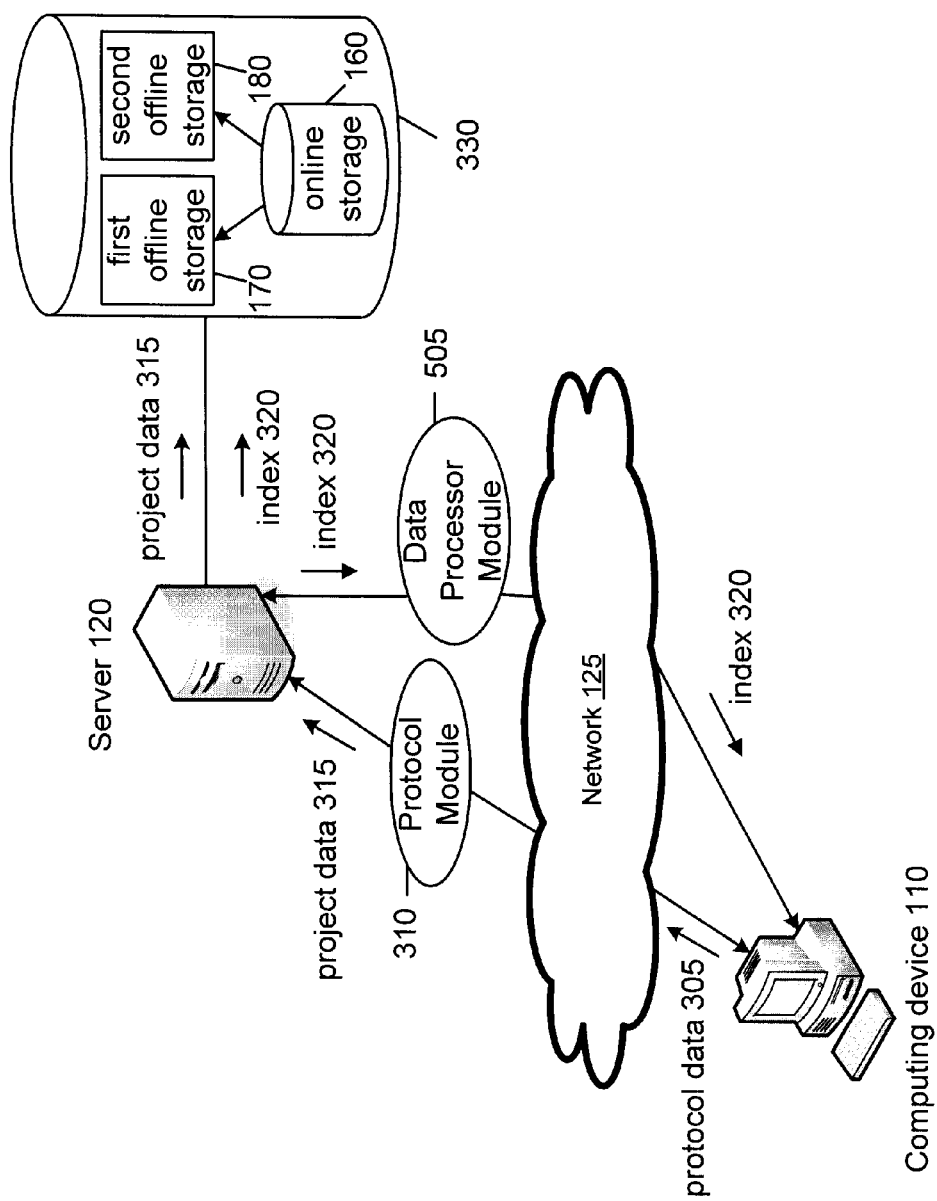
FIG. 5 is another block diagram of a server computer in communication with a computing device and a storage for use in archiving data in accordance with an embodiment of the present disclosure.

FIG. 5 depicts another embodiment of a method for project management and data archiving whereby a copy of index 320 is sent to data processor module 505. This copy of index 320 is then accessible from the computing device 110. The phrase "data processor module" as used herein means a module that stores the index, which includes data generated from the files that make up the project data 315, as well as other information. As described above, this other information can include, but is not limited to, the project title, the name of the user who created the files, the date the files were created, and the like. In one embodiment, the data processor module 505 is searchable. According to another embodiment, the data processor module 505 identifies on which random-access storage media the project data is stored.

EXAMPLES

Example 1

Flow Cytometry Experiments

The method for project management and data archiving may be used in the context of a flow cytometry experiment. In one embodiment, the client computer is a user terminal that is connected through a LAN to the server. The client computer accesses the protocol module (e.g., the program CytoGenie®, developed by Stanford University) and enters information that makes up the protocol data into CytoGenie®. The entered information includes: (1) instrument information about lasers, filters, instruments, fluorochrome spectra, and the like; (2) subject, sample and other information necessary for individual experiments; and (3) stain sets, necessary controls, and other experiment design choices to complete the protocol. In one embodiment, this information makes up the protocol data.

The flow cytometer, which is the data collector, gathers project data based on the protocols under which the experiment is conducted. The project data is displayed in CytoGenie®, which then transfers this project data to the server. The server is a single desktop or computer rack that has a RAID disk array configured to hold a large amount of data. In this example, the project data is archived on the server, which permanently stores the project data right after collection, automatically attaches the documents that constitute the protocol data, and frees the instrument as soon as the project data is transferred to the server. There is no limitation on the amount of data stored, the number of users, or the number of instruments that can be used simultaneously. The server accepts input only from authorized users and in authorized formats, and stores project data in a tamper-proof format. The project data is automatically indexed by the server. In one embodiment, at least two copies of the project data and indexes, which include all associated records, are maintained. Once there is enough information to fill the media, a CD, DVD, or Blu-Ray disc is created, verified, indexed and labeled automatically, without dividing the project data and index into separate discs. Once the information is archived successfully, a confirmation e-mail is sent to the user. The e-mail announces that the data submission has been safely archived, summarizes the archived items and their labels, and provides internet-accessible links for the items to download the project data and related information, launch analyses of the data, and send data access to other users.

The server keeps a personal, password-protected index of the user's experiments online, accessible through an internet browser. The internet-accessible index shows all of the sample labels and other information stored for each experiment.

Example 2

Flow Cytometry Experiments, Electronic Laboratory Notebook

In one embodiment, after completing the steps and processes of Example 1, the index and other information, such as the project title, the name of the user who created the files, the date the files were created, and the like, are sent to the computing device 110 (e.g., the software program CERF®, developed by Stanford University, executing on the computing device 110). CERF®, an electronic lab notebook for, inter alia, biological experiments, that integrates into an enterprise information infrastructure, provides an interface for recording research and accessing shared resources. Because CERF® obtains a record of on which disc the project data and index are stored and searches the index and other information, it allows a user to bring together and organize many different kinds of information, including, but not limited to, word processing and spreadsheet documents to complex multimedia databases, catalogs, and presentations, to launch many different computer applications and track the output in the same environment, and to describe, index and search for material in current use and in the storage archive. And in some embodiments, because CERF® provides record-keeping as well as shared information management and project organization, it permits users to organize their thoughts, ideas and data as in a traditional paper-based laboratory notebook, but with the benefits of sharing, searchability, digital signatures, templates and the like. In one embodiment, CERF® can identify for the user on what disc the project data is located when the project data is removed from the server for any reason. This feature allows the user to easily locate any data that has been gathered by the method for project management and data archiving.

Example 3

In one embodiment, the method of project management and data archiving for a business features a self-managing online/offline archive, automatic writing of data and labels to random-access storage media, automigration to new media, automatic distribution of links to files via email, automatic deposition of the links in CERF®, and automatic responsiveness to programs that use the link to call data or files.

The self-managing online/offline archive function includes maintaining at least two copies of all project data and indexes, which include all associated records. Once there is enough information to fill the media, the information automatically is migrated to a CD, DVD, or Blu-Ray disc. The disc is created, verified, indexed and labeled automatically, without dividing the project data and index into separate discs. Once the information is archived successfully, a confirmation e-mail is sent to the user. The e-mail announces that the data submission has been safely archived, summarizes the archived items and their labels, and provides internet-accessible links for the items to download the project data and related information, launch analyses of the data, and send data access to other users.

Then, the index and other information, such as the project title, the name of the user who created the files, the date the files were created, and the like, are deposited in CERF®, which is accessible from at least one client computer. CERF® will be able to identify for the user on what disc the project data is located when the project data is removed from the server for any reason. This feature allows the user to easily locate any data that has been gathered by the method for project management and data archiving. CERF® then can access all files that comprise the project data and open them for viewing, editing, analysis, etc, in CERF®, regardless of with what program the file is normally associated (i.e., a *.doc file being associated with Microsoft Word®).

Figure 6:
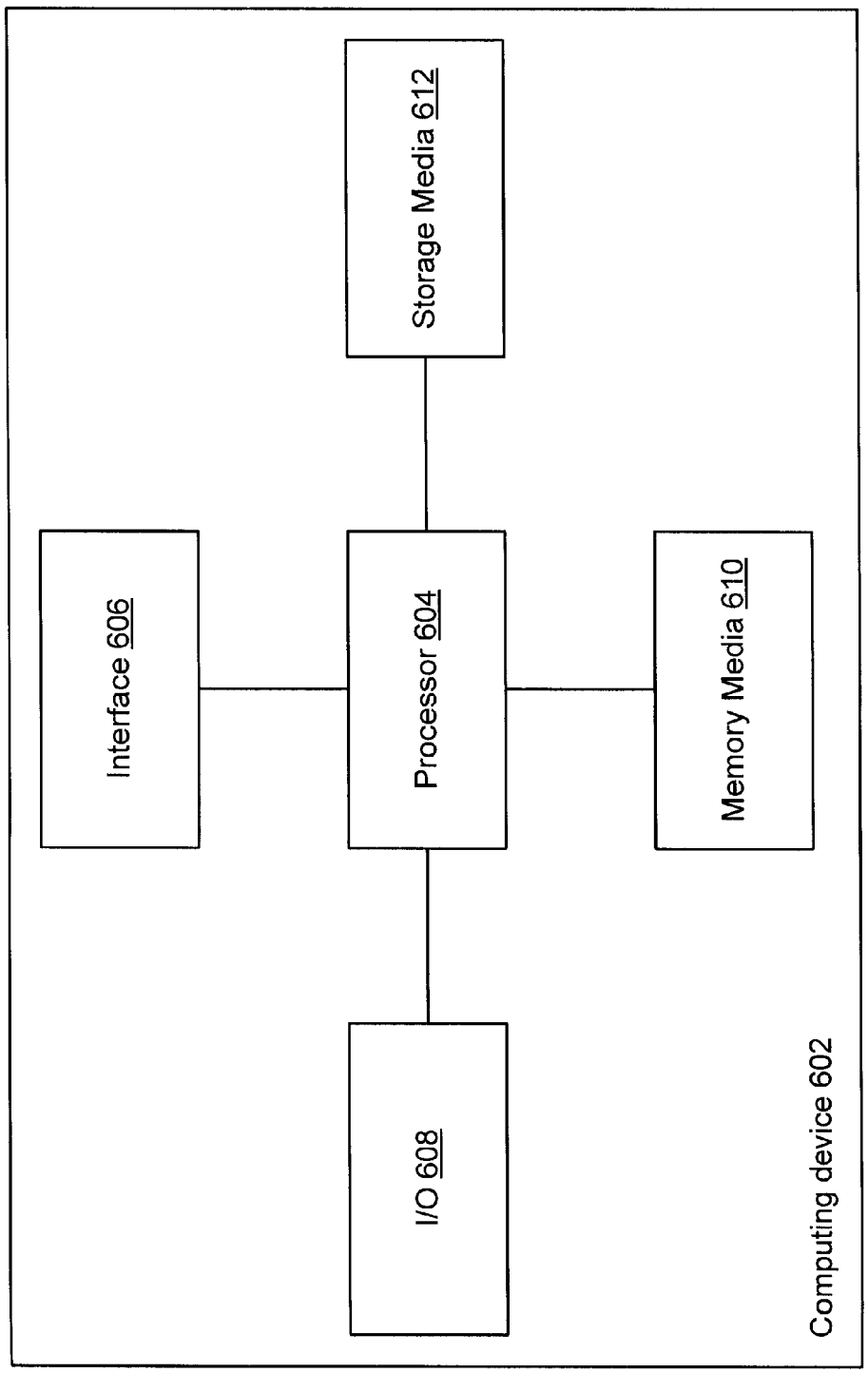
FIG. 6 is a high level block diagram of an example of a computing device such as the server and/or computing device of FIG. 1, in accordance with an embodiment of the present disclosure.

The description herewith describes the present invention in terms of the processing steps required to implement an embodiment of the invention. These steps can be performed by an appropriately programmed computing device or computer, the configuration of which is well known in the art. An appropriate computing device can be implemented, for example, using well known computer processors, memory units, storage devices, computer software, and other components. A high level block diagram of such a computing device is shown in FIG. 6. Computing device 602 is an example of computing device 110 and/or server 120 of FIG. 1 and contains a processor 604 which controls the overall operation of computing device 602 by executing computer program instructions which define such operation. The computer program instructions can be tangibly stored in a storage media 612 (e.g., magnetic or optical disk or other computer readable medium now known or to become known) and loaded into memory media 610 or read directly from media 610 when execution of the computer program instructions is desired. Computing device 602 also includes one or more interfaces 606 for communicating with other devices (e.g., locally or via a network). Computing device 602 also includes input/output 608 that represent devices that allow for user interaction with the computing device 602 (e.g., display, keyboard, mouse, speakers, buttons, etc.).

One skilled in the art will recognize that an implementation of an actual computing device will contain other components as well, and that FIG. 6 is a high level representation of some of the components of such a computing device for illustrative purposes, which can be, for example, a personal computer, PDA, wireless device, internet appliance, cellular telephone, or such processor driven technology. In addition, the processing steps described herein can also be implemented using dedicated hardware, the circuitry of which is configured specifically for implementing such processing steps. Alternatively, the processing steps can be implemented using various combinations of hardware, firmware and software. Intangible storage media such as instructions contained in electronic or optical signals can also be utilized.

Those skilled in the art will recognize that the methods and systems of the present disclosure can be implemented in many manners and as such are not to be limited by the foregoing exemplary embodiments and examples. In other words, functional elements being performed by single or multiple components, in various combinations of hardware and software or firmware, and individual functions, can be distributed among software applications at either the first or second computers or server or both. In this regard, any number of the features of the different embodiments described herein can be combined into single or multiple embodiments, and alternate embodiments having fewer than, or more than, all of the features described herein are possible. Functionality can also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that can be made to the hardware or software or firmware components described herein as would be understood by those skilled in the art now and hereafter.

The foregoing Description is to be understood as being in every respect illustrative and exemplary, but not restrictive, and the scope of the invention disclosed herein is not to be determined from the Description, but rather from the claims as interpreted according to the full breadth permitted by the patent laws. It is to be understood that the embodiments shown and described herein are only illustrative of the principles of the present invention and that various modifications can be implemented by those skilled in the art without departing from the scope and spirit of the invention. Those skilled in the art might implement various other feature combinations without departing from the scope and spirit of the invention.

What is claimed is:
1. A data archiving method comprising:
receiving, by a server computer, data transmitted over a network from a client computer, the data comprising data previously collected by a data collection instrument and information about the collected data; wherein the data comprises one or more files;

automatically checking, by the server computer, integrity of the received data at time of receipt of the received data;

organizing the related files in the one or more files into a file set;

updating, by the server computer, an index with the information about the collected data;

archiving, by the server computer, the index and the received data in each of two or more offline storages, at least one of the two or more offline storages independent from the server computer;

assigning, by the server computer, a unique identifier that couples the archived index and received data, the unique identifier enabling access to the received data via the archived index;

automatically transmitting a notification to the client computer and user specified targets that the received data has been archived in the offline storages in order to relieve the client computer from responsibility for storing the data; and automatically updating the archived index with new or additional locations for the archived data when the server detects that the data has been moved or copied to a new archive location.

2. The data archiving method of claim 1, wherein the updating of the index comprises creating the index.

3. The data archiving method of claim 1, wherein the receiving step further comprises determining that the client computer is on a list of specified client computers.

4. The data archiving method of claim 1, further comprising digitally signing the related files before organizing the related files into a file set.

5. The data archiving method of claim 1, further comprising removing the data from the server computer when the server computer requires additional storage space.

6. The data archiving method of claim 1, wherein the archiving step further comprises storing the received data in the two or more offline storages.

7. The data archiving method of claim 6, further comprising automatically creating, verifying, indexing, and labeling the two or more offline storages.

8. The data archiving method of claim 6, wherein the archiving step further comprises storing the received data and the index in the two or more offline storages.

9. The data archiving method of claim 6, further comprising automatically migrating the two or more offline storages to different storage media.

10. The method of claim 1, wherein the automatically transmitting the notification to the client computer further comprises transmitting a link or other addressing mechanism that directly or indirectly causes the server computer to transmit a copy of the archived data or a processed copy of the archived data to a location designated by a user.

11. A non-transitory computer-readable storage medium storing computer program instructions capable of being executed by a computer processor on a computing device, the computer program instructions defining the steps of:

receiving data transmitted over a network from a client computer, the data comprising experiment data previously collected by a data collection instrument and information about the collected data; wherein the data comprises one or more files, defining the step of organizing the related files in the one or more files into a file set:

updating an index with the information about the collected data;

automatically checking integrity of the received data at time of receipt of the received data;

archiving the index and the received data in each of two or more offline storages, at least one of the two or more offline storages independent from the computing device;

assigning a unique identifier that couples the archived index and received data, the unique identifier enabling access to the received data via the archived index;

automatically transmitting a notification to the client computer and user specified targets that the received data has been archived in the offline storages in order to relieve the client computer from responsibility for storing the data; and automatically updating the archived index with new or additional locations for the archived data when the server detects that the data has been moved or copied to a new archive location.

12. The non-transitory computer-readable storage medium of claim 11, wherein the updating of the index comprises creating the index.

13. The non-transitory computer-readable storage medium of claim 11, further comprising computer program instructions defining the step of removing the data from the computing device when the computing device requires additional storage space.

14. The non-transitory computer-readable storage medium of claim 11, wherein the archiving step further comprises storing the received data in the two or more offline storages.

15. The non-transitory computer-readable storage medium of claim 14, further comprising computer program instructions defining the step of automatically creating, verifying, indexing, and labeling the two or more offline storages.

16. The non-transitory computer-readable storage medium of claim 14, wherein the archiving step further comprises storing the received data and the index in the two or more offline storages.

17. The non-transitory computer-readable storage medium of claim 11, further comprising computer program instructions defining the step of automatically migrating the two or more offline storages to different storage media.

18. The method of claim 10, wherein the client computer or user specified targets use the link or other addressing mechanism to request the server computer to apply algorithms that process a copy of the requested archived data and transmit the processed copy of the archived data to the client computer, the user specified targets, or the data collection instrument.

* * * * *